United States Patent
Huneault et al.

(10) Patent No.: US 9,045,625 B2
(45) Date of Patent: Jun. 2, 2015

(54) PROCESS OF PRODUCING THERMOPLASTIC STARCH/POLYMER BLENDS

(76) Inventors: Michel Huneault, Boucherville (CA); Hongbo Li, Laval (CA)

( * ) Notice: Subject to any disclaimer, the term of this patent is extended or adjusted under 35 U.S.C. 154(b) by 223 days.

(21) Appl. No.: 13/390,187

(22) PCT Filed: Feb. 2, 2010

(86) PCT No.: PCT/CA2010/000149
§ 371 (c)(1), (2), (4) Date: Feb. 13, 2012

(87) PCT Pub. No.: WO2011/020170
PCT Pub. Date: Feb. 24, 2011

(65) Prior Publication Data
US 2012/0139154 A1 Jun. 7, 2012

Related U.S. Application Data

(60) Provisional application No. 61/272,118, filed on Aug. 18, 2009.

(51) Int. Cl.
*B29C 47/60* (2006.01)
*C08L 3/02* (2006.01)
(Continued)

(52) U.S. Cl.
CPC ... *C08L 3/02* (2013.01); *B29B 7/46* (2013.01); *B29B 7/88* (2013.01); *C08J 3/005* (2013.01); *C08J 2300/22* (2013.01); *C08J 2403/02* (2013.01); *C08K 5/053* (2013.01); *C08K 5/1539* (2013.01); *C08L 3/00* (2013.01); *C08L 23/02* (2013.01); *C08L 23/04* (2013.01); *C08L 23/06* (2013.01); *C08L 23/10* (2013.01);
(Continued)

(58) Field of Classification Search
USPC ........ 264/211.23, 3.3, 464, 623, 638, 173.12, 264/173.16, 176.1, 210.6, 211.24
See application file for complete search history.

(56) References Cited

U.S. PATENT DOCUMENTS

| | | | |
|---|---|---|---|
| 6,605,657 | B1 | 8/2003 | Favis et al. |
| 6,844,380 | B2 | 1/2005 | Favis et al. |

(Continued)

FOREIGN PATENT DOCUMENTS

| | | |
|---|---|---|
| CA | 2084994 | 11/1992 |
| CA | 2395260 | 7/2001 |

(Continued)

OTHER PUBLICATIONS

Aichholzer W, Fritz HG. (1998) Rheological characterization of thermoplastic starch materials. Starch-Starke. 50: 77-83.
(Continued)

*Primary Examiner* — Stella Yi
(74) *Attorney, Agent, or Firm* — Catherine Lemay

(57) ABSTRACT

A process of producing a thermoplastic starch/polymer blend involves introducing dry starch into a twin-screw extruder at a first location along the extruder, introducing a plasticizer into the twin-screw extruder at a second location along the extruder downstream of the first location to form a starch paste and then gelatinizing the starch paste in the extruder to form thermoplastic starch, and, introducing dry polymer at ambient temperature into the twin-screw extruder at a third location along the extruder downstream of the second location to form a blend with the thermoplastic starch in the extruder.

13 Claims, 5 Drawing Sheets

(51) Int. Cl.
  B29B 7/46    (2006.01)
  B29B 7/88    (2006.01)
  C08J 3/00    (2006.01)
  C08L 23/02   (2006.01)
  C08L 23/04   (2006.01)
  C08L 23/10   (2006.01)
  C08L 25/04   (2006.01)
  C08L 25/06   (2006.01)
  C08L 35/06   (2006.01)
  C08L 67/04   (2006.01)
  C08K 5/053   (2006.01)
  C08K 5/1539  (2006.01)
  C08L 3/00    (2006.01)
  C08L 23/06   (2006.01)
  C08L 23/14   (2006.01)
  C08L 51/06   (2006.01)
  C08L 51/08   (2006.01)

(52) U.S. Cl.
  CPC ............... C08L 23/14 (2013.01); C08L 25/04 (2013.01); C08L 25/06 (2013.01); C08L 35/06 (2013.01); C08L 51/06 (2013.01); C08L 51/08 (2013.01); C08L 67/04 (2013.01); B29C 47/6056 (2013.01)

(56) References Cited

U.S. PATENT DOCUMENTS

| | | | | |
|---|---|---|---|---|
| 2002/0188041 | A1* | 12/2002 | Bond et al. | 524/47 |
| 2003/0119949 | A1* | 6/2003 | Favis et al. | 524/47 |
| 2006/0111511 | A1* | 5/2006 | Narayan et al. | 525/54.2 |
| 2008/0036115 | A1* | 2/2008 | Ueda et al. | 264/291 |
| 2009/0247036 | A1* | 10/2009 | Shi et al. | 442/394 |

FOREIGN PATENT DOCUMENTS

| | | |
|---|---|---|
| CA | 2446092 | 11/2002 |
| CA | 2660612 | 2/2008 |

OTHER PUBLICATIONS

Averous L. (2004) Biodegradable multiphase systems based on plasticized starch : a review. Journal of Macromolecular Science-Polymer Reviews. C44: 231-274.

Chapleau N, Huneault MA, Li HB. (2007) Biaxial Orientation of Polylactide/Thermoplastic Starch Blends. International Polymer Processing. 5: 402-409.

Huneault M, Mighri F, Ko GH, Watanabe F. (2001) Polymer Engineering & Science. 41: 672-683.

Huneault MA, Li HB. (2007) Morphology and properties of compatibilized polylactide/thermoplastic starch blends. Polymer. 48: 270-280.

Ke T, Sun X. (2001) Transaction of the American Society of Agricultural Engineers. 44: 945-953.

Mihai M, Huneault MA, Favis BD, Li HB. (2007) Foaming of PLA/Thermoplastic Starch Blends. Macromolecular Bioscience. 7: 907-920 (2007).

Rodriguez-Gonzalez FJ, Ramsay BA, Favis BD. High performance LPDE/thermoplastic starch blends: a sustainable alternative to pure polyethylene. (2003) Polymer. 44(5): 1517-1526.

Schwach E, Averous L. (2004) Starch-based biodegradable blends: morphology and interface properties. Polymer International. 53: 2115-2124.

Seidenstucker T, Fritz H-G. Compounding Procedure, Processing Behaviour and Property Profiles of Polymeric Blends Based on Thermoplastic Poly(ester-urethanes) and Destructurized Starch. (1999) Starch-Starke. 51(2-3): 93-102.

Vergnes B, Villemaire JP. (1987) Rheological behaviour of low moisture molten maize starch. Rheol Acta. 26: 570-576.

Villar MA, Thomas EL, Armstrong RC. (1995) Rheological properties of thermoplastic starch and starch/poly (ethylene-co-vinyl alcohol) blends. Polymer. 36: 1869-1876.

Wang XL, Yang KK, Wang YZ. (2003) Properties of starch blends with biodegradable polymers. Journal of Macromolecular Science-Polymer Reviews. C43: 385-409.

Wiedmann W, Strobel E. (1991) Compounding of Thermoplastic Starch with Twin-screw Extruders. Starch-Starke. 43 (4): 138-145.

Willett JL, Jasberg BK, Swanson CL. (1995) Rheology of Thermoplastic Starch: Effect of Temperature, Moisture Content, and Additives on Melt Viscosity. Polymer Engineering and Science. 35(2): 202-210.

PCT International Preliminary Report on Patentability, PCT/CA2010/000149, Dec. 13, 2011.

PCT Written Opinion of the International Searching Authority, PCT/CA2010/000149, May 10, 2010.

PCT International Search Report, PCT/CA2010/000149, May 10, 2010.

* cited by examiner

PROCESS OF PRODUCING THERMOPLASTIC STARCH/POLYMER BLENDS

CROSS-REFERENCE TO RELATED APPLICATIONS

This application is a national phase entry of International Application PCT/CA 2010/000149 filed Feb. 2, 2010 and claims the benefit of U.S. Provisional Patent Application Ser. No. 61/272,118 filed Aug. 18, 2009, the entire contents of both of which are herein incorporated by reference.

FIELD OF THE INVENTION

The present invention relates to processes for preparing polymeric compositions. In particular, the present invention relates to blends of polymer and thermoplastic starch and processes for producing such blends.

BACKGROUND OF THE INVENTION

Thermoplastic starch is produced by mixing native starch with a plasticizer at a temperature above the starch gelatinization temperature, typically in the 70-90° C. range. This operation weakens the hydrogen-bonds present in the native starch leading to a fully amorphous free-flowing material. The resulting material is known as plasticized starch, destructured starch or thermoplastic starch (TPS). The properties and rheology of thermoplastic starch have been thoroughly investigated (Aichholzer 1998; Vergnes 1987; Villar 1995; Willett 1995). As such, the TPS is not a suitable material for most common uses. It is very hygroscopic and its properties and dimensional stability are strongly affected by the humidity level since water is a plasticizer for TPS. Also in presence of humidity, the amorphous TPS tends to reform its hydrogen-bonds leading to recrystallization (also called retrogradation) and in turn to embrittlement of the material.

This strong property dependence on plasticizer content can become an advantage however when the TPS is blended with another hydrophobic polymer. In this case, the hydrophobic polymer can protect the TPS from direct water contact and moisture uptake while the plasticizer level in the TPS can be used to tune the mechanical properties of the TPS. Therefore, the vast majority of work involving the use of starch as a material has focused on blending of TPS and other synthetic polymers (Averous 2004; Schwach 2004; Wang 2003). The synthetic material can be biodegradable to produce a fully compostable material or can be non-biodegradable to produce materials for longer-term applications. Examples of biodegradable blends include blends of TPS with polycaprolactone or polybutylene succinate which are two petrochemical based polymers. With the recent commercial introduction of poly(lactic acid) PLA, there has also been a high interest for PLA/TPS blends and these have been investigated in terms of their compatibility (Huneault 2007) and of their processing into injection molded product, biaxially oriented films (Chapleau 2007) and low density foams (Mihai 2007).

The compounding process used for the preparation of TPS/polymer blends is relatively complex. It must nominally enable the precise metering of starch and plasticizers, the starch gelatinization and the mixing of the TPS with the second polymer phase to obtain finely dispersed or finely segregated blend morphology. Additionally, more elaborate functions may be performed. For example, venting or devolatilization may be used to control volatiles levels. Interface modification through in situ interfacial reaction may be used to compatibilize the blend or to modify the starch interface. Surprisingly, very little scientific publications have focused on the effect of the process on the final blend properties and little guidance can be found as to what could be the best practices in terms of TPS/polymer blend compounding technology.

In order to prepare finely dispersed blends of thermoplastic starch and synthetic polymers, it is beneficial to prepare the blends using a sequence of operation carried out along a twin-screw extrusion process (Favis 2003; Favis 2005; Favis 2008; Rodriguez-Gonzalez 2003). In the process described in the Favis et al. patents (Favis 2003; Favis 2005; Favis 2008; Rodriguez-Gonzalez 2003), the basic ingredients for the making of thermoplastic starch, starch, water and glycerol, are first mixed in 50:25:25 proportions to form a suspension (also referenced as a slurry). This suspension is pumped into the extruder. Under the action of shear and heat, the starch and plasticizers (water and glycerol) are transformed into thermoplastic starch (TPS) through a well known transformation called "gelatinization". Further along the extrusion process, the water is removed to get a water-free TPS that is solely plasticized by glycerol. Then, further along the process, a synthetic polymer is added and mixed with the TPS to form the TPS/polymer mixture that is the end result of the process. In the Favis et al. process, it is specified that the synthetic polymer must be added in molten form to prepare blends with an acceptable dispersion.

There are at least two problems with the process presented in the prior art described above. First the use of a suspension forces the use of a high initial water content because starch suspensions necessitate at least 50% liquid to be pumped into the extruder. Since a water-free TPS is desired, this involves a very high rate of devolatilization and in turn a lower production rate and higher energy need. According to the Favis et al. patents cited above however, this water is necessary to achieve proper TPS gelatinization. The second problem with the Favis et al. process is that the synthetic polymer must be fed to the twin-screw process in liquid form. Thus a single-screw extruder must be used to heat, melt and pump the polymer into the extruder. Favis 2005 and Favis 2008 teach that feeding in liquid (molten) form is necessary for the formation of finely dispersed blends and in turn to good retention of material ductility. Feeding a polymer in molten form requires an auxiliary unit such as a single-screw extruder that is able to heat and pump the polymer at high pressure and thus requires additional energy, involves additional cost in comparison to feeding the polymer at room temperature.

In another report (Seidenstucker 1999), thermoplastic poly (ester-urethanes) (TPU) were compounded with destructurized starch in a twin-screw extruder. This report describes two-step processes similar to Favis et al. in which thermoplastic starch (TPS) is first made by pre-mixing starch with a polyfunctional alcohol before introduction into the twin-screw extruder. This report also describes a single-step process in which starch is introduced into the twin-screw extruder followed by introduction of glycerol downstream to form the thermoplastic starch in the extruder, and then followed by introduction of TPU further downstream in the extruder. This report indicates that the throughput of the single-step process is reduced to one-third of the two-step processes. Only two-step processes are actually used to produce TPS/polymer blends in this report, and there is no description of how much or even whether water can be used in conjunction with the glycerol for forming the thermoplastic starch in the single-step process.

In yet another report (Wiedman 1991), a twin-screw extrusion sequence is described for a food processing extrusion line involving thermoplastic starch. In this case steam injection and an unspecified liquid feed are used. There is no description of any particular plasticizer composition involving polyfunctional alcohols and water and no description of any control over the ratio of water to polyfunctional alcohol in the plasticizer. Even if the unspecified liquid feed did contain polyfunctional alcohol, controlling the water:polyfunctional alcohol ratio would be very difficult using the steam injection process. Further, to introduce polymer into the line, either a feeder located at the same point as the starch feeder or a downstream twin-screw side feeder could be used. If the feeder is used to introduce dry polymer, the polymer would be added at the same point in the line as the starch. If the downstream twin-screw side feeder is used, the polymer would be introduced in liquid form.

There remains a need in the art for an efficient process of making thermoplastic starch/polymer blends.

SUMMARY OF THE INVENTION

It has now been found that separately introducing dry starch and liquid plasticizer as input for a thermoplastic starch (TPS) phase and solid room temperature incorporation of a polymer phase in a twin-screw operation sequence overcomes one or more of the problems associated with prior art processes.

There is provided a process of producing a thermoplastic starch/polymer blend comprising: introducing dry starch into a twin-screw extruder at a first location along the extruder; introducing a plasticizer into the twin-screw extruder at a second location along the extruder downstream of the first location to form a starch paste and then gelatinizing the starch paste in the extruder to form thermoplastic starch; and, introducing dry polymer at ambient temperature into the twin-screw extruder at a third location along the extruder downstream of the second location to form a blend with the thermoplastic starch in the extruder.

The dry starch can be any suitable starch that can be converted to thermoplastic starch. For example, starch obtained from corn, wheat, triticale, peas, potatoes, rice, cassava and sorghum, as well as chemically modified starches (e.g. acetylated starch, hydroxypropylated starch, phosphorylated starch) can be converted into TPS. The starch is introduced into the twin-screw extruder in dry form, for example, as pellets, granules, powders and the like, by any suitable means, for example feeders.

The plasticizer comprises a functionalized compound, for example a polyfunctional alcohol or an amide functionalized compound. The polyfunctional alcohol may be, for example glycerol, sorbitol, polyethylene glycol or mixtures thereof. The amide functionalized compound may be, for example, urea, formamide, ethylene-bisformamide or mixtures thereof. The plasticizer preferably comprises glycerol and/or sorbitol.

Starch-slurry processes as described in the prior art (e.g. Favis 2003; Favis 2005; Favis 2008; Rodriguez-Gonzalez 2003) typically have a water:glycerol ratio of about 1:1 w/w. Lower amounts of water in the plasticizer facilitates the formation of a starch paste rather than a slurry. Thus, the plasticizer preferably does not comprise water or comprises water and the functionalized compound in a ratio in a range of from 0.01:10 to 5:10 w/w water:functionalized compound. The ratio of water:functionalized compound is preferably in a range of from 0.5:10 to 2:10 w/w, for example 1:10 w/w.

The plasticizer is introduced into the extruder in an amount related to the amount of starch introduced. Preferably, the plasticizer is used in an amount to provide the functionalized compound in a range of from 20 wt % to 40 wt % based on the weight of water-free thermoplastic starch phase, more preferably in a range of from 24 wt % to 36 wt %. Preferably, the total amount of plasticizer used (water+functionalized compound) is 40 wt % or less based on the weight of starch used, more preferably in a range of from 5 wt % to 40 wt %. Liquid plasticizer may be introduced into the extruder by any suitable means, for example by use of a feed line and a pump. Solid plasticizer can be fed using a gravimetric or volumetric feeder. Water may be removed from the thermoplastic starch by one or more volatilization steps in the extruder.

The formation of a starch paste between the dry starch and the plasticizer is an important and advantageous distinction of the present process over slurry processes such as the one disclosed by Favis et al. In slurry processes, sedimentation due to gravity can create problems with blend consistency. In the present process, the paste comprises solid particulates contacting each other with the liquid acting as a lubricant, thus, sedimentation is not a significant issue.

The polymer may comprise any suitable polymer for blending with thermoplastic starch. The particular polymer is generally dictated by the end use of the TPS/polymer blend. Polymers comprising polyethylene, polypropylene, polystyrene, poly(lactic acid), poly(ε-caprolactone), polybutylene succinate, copolymers thereof or mixtures thereof are specific examples of polymers for which the process of the present invention is particularly suited. The polymer may be introduced into the extruder in an amount to provide TPS/polymer blends having an amount of TPS in a range of from 5 wt % to 95 wt % based on the weight of the blend, more preferably in a range of from 10 wt % to 90 wt %. The polymer is introduced into the twin-screw extruder in dry form, for example, as pellets, granules, powders and the like, by any suitable means, for example feeders.

The polymer may be compatibilized with the starch using a compatibilizer. Preferred compatibilizers are random or graft copolymers where the main monomer is of similar nature as the polymer to be compatibilized and where the grafted or randomly copolymerized co-monomer is capable of reacting with available hydroxyl moieties of starch. The reactive co-monomers may be unsaturated carboxylic acids, unsaturated carboxylic acid anhydrides, esters of acrylic acid or mixtures thereof, more preferably unsaturated carboxylic acid anhydrides. Some suitable unsaturated carboxylic acids include, for example, acrylic acid, maleic acid, tetrahydrophthalic acid, fumaric acid, itaconic acid, nadic acid, and methylnadic acid. Some suitable anhydrides include, for example, maleic anhydride, tetrahydrophthalic anhydride, fumaric anhydride, itaconic anhydride, nadic anhydride, and methylnadic anhydride. Maleic anhydride is of particular note. A suitable ester of acrylic acid may be, for example, glycidyl methacrylate. Grafting level in grafted polymers is preferably from 0.2 wt % to 5 wt % based on total weight, more preferably from 0.5 wt % to 2 wt %. For copolymers, the reactive monomer content is preferably from 1 wt % to 20 wt %, preferably from 5 wt % to 10 wt %. Preferably, the compatibilization is accomplished by partially substituting the base polymer with the compatibilizer. From 2 wt % to 25 wt % of the polymer is substituted with the compatibilizer, more preferably from 5 wt % to 15 wt %.

Flow rates for introducing the various components into the twin-screw extruder may be set to achieve the proportions outlined above. Process temperatures may be any suitable temperature used in the art for thermoplastic starch/polymer blending, for example as disclosed by Favis et al. (Favis 2003; Favis 2005; Favis 2008; Rodriguez-Gonzalez 2003) with the advantage that polymer may be fed into the extruder in dry form at ambient temperature. In one embodiment of the process, dry starch is introduced into the twin-screw extruder at a rate of 7 kg/hr, polyfunctional alcohol is introduced at a rate of 3 kg/hr, water is introduced at a rate of 0.3 kg/hr and polymer is introduced at a rate of 3 kg/hr, with a TPS/polymer blend output of 13 kg/hr and a water removal rate of 0.3 kg/hr.

The process of the present invention may also include other steps useful for producing usable thermoplastic starch/polymer blends. For example, water from the thermoplastic starch may be removed before the introduction of dry polymer. Water removal may be accomplished by any suitable means, for example, by using a vent under atmospheric pressure or under vacuum. Further, the thermoplastic starch/polymer blend may be extruded through an extrusion die to directly form a final product or formed into an extrudate that will be pelletized prior to further processing using conventional polymer processing machinery.

Advantageously, the process of the present invention requires the use of less water in the plasticizer than two-step processes such as the one disclosed by Favis et al. resulting in lower energy requirements and higher production rate. Because of the lower water usage, lower residual water levels in the TPS can be obtained. This is an advantage when blending the TPS with water-sensitive biopolymers such as polylactides and polyhydroxyalcanoates. Further, the process does not require feeding molten polymer into the extruder line thereby lowering energy demand and reducing cost.

Further features of the invention will be described or will become apparent in the course of the following detailed description.

BRIEF DESCRIPTION OF THE DRAWINGS

In order that the invention may be more clearly understood, embodiments thereof will now be described in detail by way of example, with reference to the accompanying drawings, in which.

DESCRIPTION OF PREFERRED EMBODIMENTS

Example 1

Comparison of Starch-Slurry and Dry-Starch Processes

Materials

Figure 1:
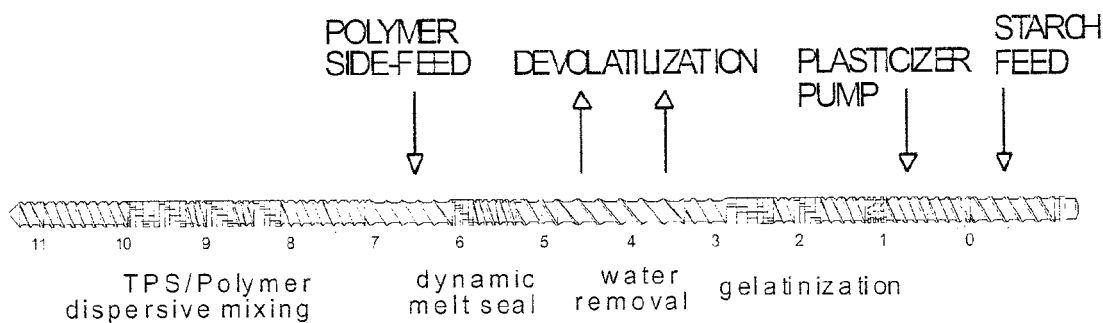
FIG. 1 depicts a twin-screw extrusion configuration for a dry-starch process of the present invention.

Wheat starch was used as the sole starch source. The starch was an industrial purpose starch grade, Supergel™ 1201, supplied by ADM. The grade names and suppliers of PE, PP, PS, PCL and PLA are summarized in Table 1. The blend composition was set to 25% TPS for all TPS/polymer blends. For compatibilization of the TPS/polymer blends, functional polymers containing maleic anhydride were used to react with the starch macromolecules to create graft block copolymers that are known to act as emulsifiers in polymer blends. In the case of PE and PP, the functional version were maleic anhydride grafted PE and PP. For blends of TPS with PS, a random copolymer of styrene and maleic anhydride, SMA. For PLA, no such MAh grafted version was commercially available. Thus PLA-g-MAh was produced by extruding PLA in presence of 2% maleic anhydride and 0.25% organic peroxide. For PE, PP and PS, 10% of the polymer was substituted by the maleated analogs. For PLA, 20% substitution was used.

TABLE 1

List of Polymers

| Name | Abbrev. | Grade/Supplier |
|---|---|---|
| High-density polyethylene | PE | DMDA8920, Petromont |
| Polypropylene copolymer | PP | Profax SB821, Basell |
| Polystyrene | PS | PS 3500, Nova Chemicals |
| Polycaprolactone | PCL | Tone 787, Dow Chemicals |
| Poly(lactic acid) | PLA | PLA 4032D, Nature Works |
| MAh grafted PE | PE-g-MAh | Polybond 3009 |
| MAh grafted PP | PP-g-MAh | Polybond 3150 |
| MAh grafted PLA | PLA-g-MAh | Experimental |
| Styrene-MAh copolymer | SMA | Dylark 232, Nova Chemicals |

Blend Preparation

Two material incorporation processes were compared. A prior art process (Favis 2003; Favis 2005; Favis 2008; Rodriguez-Gonzalez 2003), referred to as the "starch-slurry process", was compared to a process of the present invention, referred to as the "dry-starch process".

The starch-slurry process comprises premixing the plasticizer and the starch in presence of an excess of water to form a slurry that can easily be pumped into the primary feed-port. This process was first reported by Rodriguez-Gonzalez et al. (Rodriguez-Gonzalez 2003) and was later used in a number of works focused on polyethylene/TPS blends. It was assumed that the excess water in the suspension accelerates the gelatinization process. It must be removed at mid-extruder using vacuum devolatilization to provide a water-free TPS before mixing in the second polymer phase. The second polymer phase was added in molten form using a single-screw extruder as a side-feeder. In the present comparative examples, the polymers were fed in the form of regular solid pellets using a regular side feeder.

Surprisingly, it has now been found experimentally for selected blends that similar blend morphologies could be achieved with melt and solid polymer side-feeding.

In the dry-starch process of the present invention, TPS/polymer blends were prepared on a Leistritz 34 mm co-rotating twin-screw extruder with an L/D ratio of 42. The process and screw configuration for TPS/polymer blending are presented in FIG. 1. Barrel sections 0 to 3 were used to gelatinized the starch. Sections 4 to 6 were used for the devolatilization under vacuum. This first half of the extrusion process was typically operated at $T_{gel}$=140° C. but for selected experiments it was decreased down to 85° C. to investigate the effect of temperature on the starch gelatinization. Sections 7 to 11 were used to thoroughly mix the TPS with the second polymer phase. This mixing step was carried out at 180° C. in all cases. All blend compounding runs were carried out at a rate of 10 kg/hr and extruded through a 2-strand die. The strands were air-cooled and pelletized. The PLA was dried prior to compounding and the compounded pellets were dried again in a desiccating dryer at 55° C. prior to injection molding.

The dry-starch process comprises feeding the starch in dry-form at the primary feed-port and pumping the plasticizers further down along the extrusion line in barrel section 1 as shown in FIG. 1. This process enables plasticizer incorporation and gelatinization to be carried out in a single continuous operation without any need for pre-mixing. The second polymer phase is added at mid-extruder in pellet form. As with the starch-slurry process, excess water is pumped along with the glycerol and later devolatilized. For the dry starch process, a 1:10 w/w water:glycerol ratio was used as a standard condition but this ratio was varied in specific experiments to assess the effect of water on the TPS gelatinization. In this case however, the water and glycerol input concentrations were independent and not limited by any practical slurry pumping concerns.

Gelatinization

X-ray diffraction was used to detect changes in the crystalline and ordered structures of starch upon processing and as a way to insure that complete gelatinization was achieved at the end of the compounding process. Wide-angle X-ray diffraction measurements were carried out directly on the pure TPS bands. The diffraction patterns were obtained with a D-8 X-Ray Diffractometer (Bruker). The samples were exposed to X-ray beam with the X-ray generators running at 40 Kv, and 40 mA. The scanning was carried out at a rate of 0.03 o/s in the angular region (2θ) of 2-40°.

Figure 2:
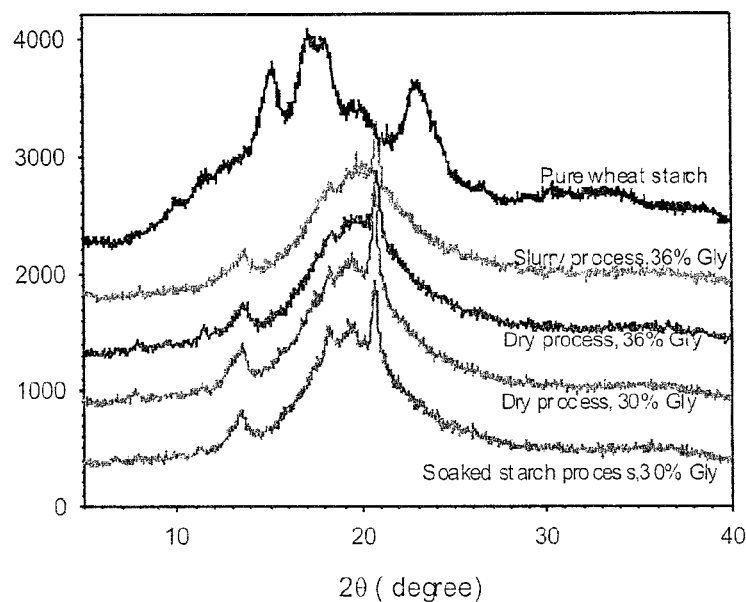
FIG. 2 depicts X-ray diffraction patters showing intensity of starch and thermoplastic starch (TPS) produced using different plasticizer addition methods.

In FIG. 2, the diffraction intensity was compared for native and thermoplastic starch obtained with starch-slurry and dry-starch processes operated at 140° C. Also presented in the figure is dry-starch previously soaked with the plasticizers and extruded into TPS, which is another prior art process for making TPS. The peaks observed around 15, 18 and 23° for the native wheat starch correspond to those expected from the A-type crystalline structures. These peaks have totally disappeared in all gelatinized starches regardless of the preparation technique. Sharp new peaks at 13.5° and 21° and a broader one around 19° have appeared for the gelatinized starches indicative of the V-type structure. Thus, regardless of the process, the gelatinization was completed at the point where the TPS is mixed with the second polymer at mid-extruder.

Dispersion

The blend morphology was assessed by observation of microtomed surfaces using scanning electron microscopy (SEM). The surfaces were prepared using an ultramicrotome at −100° C. using a diamond knife. The surfaces were subsequently treated with hydrochloric acid (HCl, 6 N) for 3 hr to selectively extract the TPS phase.

Figure 3:
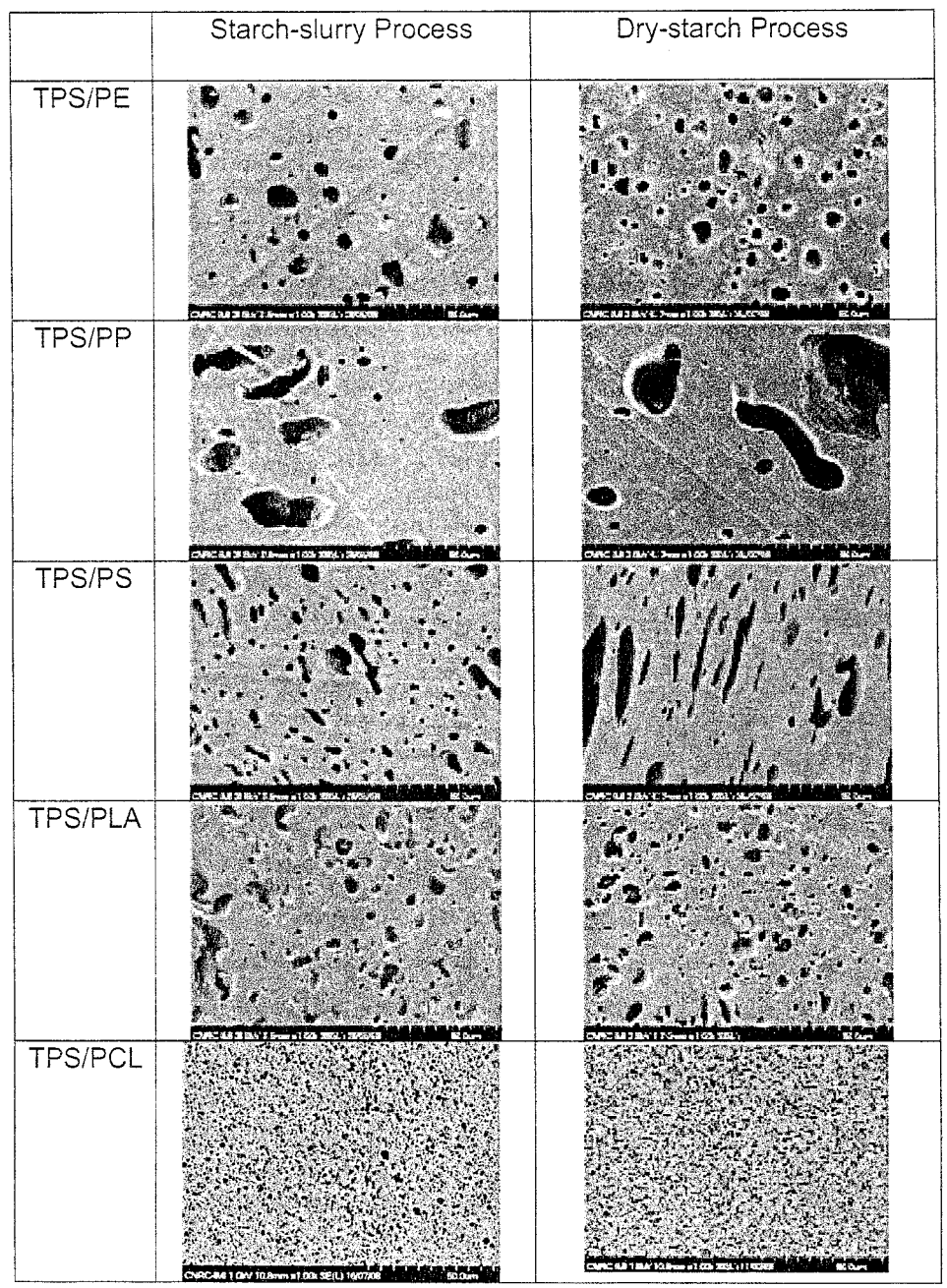
FIG. 3 depicts SEM micrographs of uncompatibilized 25% TPS/polymer blends produced with the starch-slurry process of the prior art (left) and the dry-starch process of the present invention (right)

The most important measure of mixing quality in a polymer blend is usually the size of the dispersed phase. FIG. 3 presents SEM micrographs of uncompatibilized blends obtained with the starch-slurry (left) and dry-starch (right) processes. The TPS was selectively removed prior to SEM observation to enhance contrast. The compositions were similar in all cases with 27 wt % TPS in the different continuous phases. The TPS phase comprised 36 wt % glycerol on a water-free TPS basis. For the starch-slurry process, a 1:1 water:glycerol ratio was used in the slurry. A 1:10 water:glycerol ratio was selected for the dry-starch process. Since water is removed to a great extent in the devolatilization zone of the extrusion process, similar final blend compositions were obtained at the end of the two process variants. The TPS dispersion was coarsest in PE and PP as expected from the non-polar nature of polyolefins. The dispersed phase size obtained with the starch-slurry and dry-starch processes were similar. The TPS particle diameter in PE ranged between 5 and 15 μm. In PP, the TPS phases were larger, in excess of 50 μm, and with irregular shapes. Obviously, the dispersed phase was capable of coalescing since the final TPS domain size largely exceeded the initial native starch particle dimension (ca. 15-25 μm). In PS and PLA, the TPS particle dimensions were slightly smaller and the particles exhibited more irregular shapes as if they were still in the process of being deformed under flow. Again, no significant morphological differences were observed when comparing the two compounding processes. The last investigated blend was TPS/PCL. PCL is known to be more compatible with TPS due to its more polar nature. For both processes, the morphology was much finer with particle sizes on the micrometer level.

Figure 4:
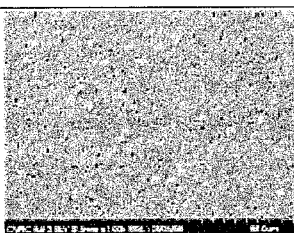
FIG. 4 depicts SEM micrographs on 25% TPS/polymer blend compatibilized with maleic anhydride-containing copolymers produced with the starch-slurry process of the prior art (left) and the dry-starch process of the present invention (right)

FIG. 4 presents SEM micrographs for the same blends as in FIG. 3 but in this case in presence of their respective compatibilizing agents described in the Table 1. The compatibilizing agents used are all modified version of the continuous phase polymer containing various amount of maleic anhydride. The maleic anhydride moieties increase the polarity of the polymer and can potentially react with hydroxyl groups present on the starch macromolecules. This reaction necessarily occurs at the blend interface and thus forms in situ graft copolymers that act as an emulsifier in the blend. When comparing FIGS. 3 and 4, it is clear that all the maleated compatibilizers used successfully reduced the dispersed phase size. In the PE and PS matrices, the TPS particle size was lowered to the 1-2 μm range. For TPS/PP, the particle size was not decreased to the micron level but were still significantly reduced compared to the morphology of the uncompatibilized blends. For the compatibilized TPS/PLA blends, slightly finer morphologies were obtained with the dry-starch process.

Tensile Properties

Table 2 presents the tensile properties of the blends containing 25% TPS in the various investigated polymer matrices. The properties of the pure matrices are given as reference. In the case of PE and PP based blends, the modulus and strength of the blends were similar to that of the PE and PP matrices but the elongation was severely decreased. For the noncompatibilized TPS/PE blends, the elongation obtained with the dry-starch process was significantly higher compared to the starch-slurry process. The effect was even more pronounced in the compatibilized TPS/PE and TPS/PP cases. In fact, for the PE based blend, the samples were able to extend up to the maximum extension of the tensile testing equipment (i.e. 800%). PS and PLA were more rigid matrices. The addition of TPS therefore decreased the modulus and strength in a more significant way but left nearly unchanged the already low elongation at break of the matrices. The TPS and PCL are known to be more compatible without the use of an interfacial modifier. The tensile modulus and strength were decreased with addition of the TPS phase but the elongation at break remained in excess of 800%. In view of these findings, it seems that relatively similar tensile properties can be achieved with the starch-slurry and dry-starch processes, except that the dry-starch process can provide significant improvement in elongation properties. The dry-starch process has an advantage in blends with water-sensitive materials because of the lower achievable TPS moisture content.

TABLE 2

Tensile Properties of Polymers and Polymer Blends

| Polymer | Process | Modulus (GPa) | Tensile Strength (MPa) | Elongation at break (%) |
|---|---|---|---|---|
| PE | | 1.12 | 17.9 | >800 |
| TPS/PE | Starch-slurry | 1.41 | 16.0 | 133 |
| | Dry-starch | 1.05 | 15.8 | 233 |

TABLE 2-continued

Tensile Properties of Polymers and Polymer Blends

| Polymer | Process | Modulus (GPa) | Tensile Strength (MPa) | Elongation at break (%) |
|---|---|---|---|---|
| TPS/PE-g-MAh | Starch-slurry | 1.14 | 18.7 | 27 |
|  | Dry-starch | 0.935 | 16.0 | >800 |
| PP |  | 1.00 | 18.8 | 700 |
| TPS/PP | Starch-slurry | 1.06 | 16.8 | 19 |
|  | Dry-starch | 0.914 | 16.4 | 12 |
| TPS/PP-g-MAh | Starch-slurry | 1.16 | 19.85 | 15 |
|  | Dry-starch | 0.989 | 18.0 | 44 |
| PS |  | 3.28 | 37.0 | 2.0 |
| TPS/PS | Starch-slurry | 3.09 | 34.1 | 1.9 |
|  | Dry-starch | 2.97 | 31.0 | 2.1 |
| TPS/SMA | Starch-slurry | 3.13 | 31.5 | 1.4 |
|  | Dry-starch | 2.87 | 31.9 | 2.0 |
| PLA |  | 3.68 | 69.2 | 6.0 |
| TPA/PLA | Starch-slurry | 3.20 | 49.0 | 4.9 |
|  | Dry-starch | 3.33 | 46.6 | 4.0 |
| TPS/PLA-g-MAh | Starch-slurry | 3.18 | 49.6 | 4.2 |
|  | Dry-starch | 2.96 | 45.8 | 6.8 |
| PCL |  | 0.43 | 25 | >800 |
| TPS/PCL | Starch-slurry | 0.339 | 12.3 | >800 |
|  | Dry-starch | 0.259 | 11.0 | >800 |

Two starch/plasticizer incorporation schemes referred to as the starch-slurry (prior art) and dry-starch methods (present invention) were compared using a water:glycerol plasticizer. Complete gelatinization was obtained regardless of the process when the starch was gelatinized at temperatures in excess of 85° C. Very similar blend morphologies and blend mechanical properties were obtained using the slurry and dry starch processes and these two methods enabled fabrication of TPS with high plasticizer contents. The dry-starch method of the present invention in which the starch and plasticizer were fed sequentially in the extruder was shown to be most flexible since it enabled the use of any desired plasticizer and initial water level and does not require any premixing step. The starch-slurry method enabled the use of high glycerol fraction compared to the amount of starch, but at the same time required the use of a high initial water fraction to maintain sufficient slurry fluidity. This increased initial water usage in the starch-slurry process of the prior art increases the required devolatilization rates and required process energy without benefit in terms of blend properties.

Example 2

Comparison of Glycerol- to Sorbitol-Based Plasticizer in Dry-Starch Process

This example investigates the morphology and properties of TPS/PLA blends prepared using the dry-starch process of the present invention, with TPS plasticized by sorbitol, glycerol and glycerol/sorbitol mixtures.

Materials

Poly(lactic acid), supplied by Nature Works, was a semicrystalline grade (PLA 4032D) comprising around 2% D-LA. Wheat starch, Supergel™ 1203, was provided by ADM-Ogilvy. D-Sorbitol was obtained from Aldrich Chemical Company with a purity of 98%. The glycerol was a 99.5% pure USP grade supplied by Mat Laboratories. The reactive modification of PLA was performed using maleic anhydride (95% pure) and 0.25% of a peroxide initiator 2,5-dimethyl-2,5-di-(tertbutylperoxy) hexane (Luperox™ 101 or L101) obtained from Aldrich Chemical Company. The maleic anhydride grafted PLA was prepared according to the method described in an earlier work (Huneault 2007).

Blend Preparation

PLA/TPS blends were prepared on a Leistritz 34 mm co-rotating twin-screw extruder with an L/D ratio of 42. The process and screw configuration are presented in FIG. 1. The dry-starch and sorbitol were dry-blended and were supplied to the primary feed hopper using a gravimetric feeder. The glycerol was pumped into the extruder in the subsequent barrel zone. Water was added with glycerol to accelerate the starch gelatinization process but was removed by vent and vacuum devolatilization in barrel zones 4 and 5. The PLA was added in pellet form using a side-feeder to the water-free gelatinized starch at barrel zone 7 and then mixed in the subsequent kneading section of the extruder. When maleic anhydride grafted PLA (PLA-g-MAh) was used to compatibilize the blend, it was dry-blended with PLA prior to extrusion. In that case, 20% PLA was substituted by PLA-g-MAh. The sorbitol/glycerol ratio was varied from 0:36, 12:24, 24:12, 36:0, maintaining a total plasticizer content of 36 wt % in TPS phase. The extruder temperature was set to 140° C. in barrel zone 1 to 6 dedicated to starch gelatinization and water removal. In the second extruder portion dedicated to PLA/TPS mixing, the extruder temperature was set to 180° C. The mixtures were extruded at a rate of 10 kg/hr through a 2-strand die. TPS content was kept at 27 wt %. The strands were water-cooled and pelletized. The PLA was dried prior to compounding and the compounded pellets were dried again in a desiccating dryer at 60° C. prior to injection molding and to subsequent analysis.

Blend Morphology

Blend morphology was assessed by observation of microtomed surfaces using scanning electron microscopy (SEM). Microtoming was carried out at room temperature using a diamond knife and the surfaces were subsequently treated with hydrochloric acid (HCl, 6 N) for 3 hr to selectively dissolve the TPS phase.

Figure 5:
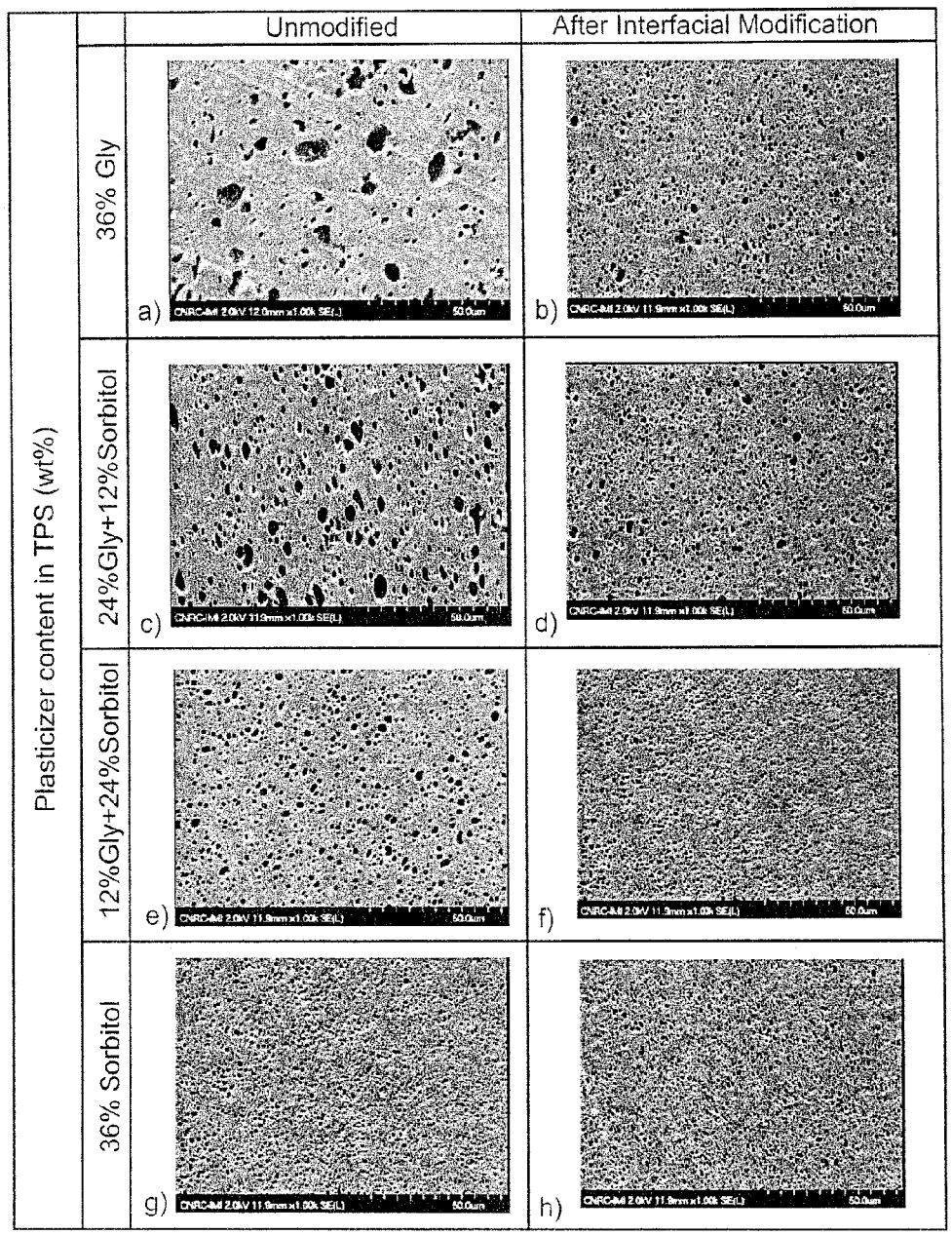
FIG. 5 depicts SEM micrographs showing effect of different sorbitol/glycerol ratio on 27% TPS/PLA blend morphology, for unmodified PLA (left) and PLA-g-MAh (right); and, FIG. 6 depicts a graph showing effect of sorbitol/glycerol ratio on tensile strength and modulus of TPS/PLA blends.

The morphology of 27% TPS/PLA blends for different glycerol/sorbitol ratios is presented in FIG. 5. A very coarse morphology with particles ranging from 5 μm to 30 μm was obtained for non-compatibilized (unmodified) glycerol plasticized blends. Surprisingly, as the glycerol was substituted by increasing levels of sorbitol (panels a), c), e) and g)), the particle size progressively decreased to the 1-2 μm range and the particles became more spherical and homogeneously distributed.

The dispersed phase size reduction with the substitution of glycerol by sorbitol was unexpected. It is noteworthy that the blend morphologies reported here are much finer than those reported by Ke et al. (Ke 2001) for sorbitol-TPS/PLA blends. Ke et al. have investigated blends of PLA and up to 40 wt % TPS plasticized by adding 5-25 wt % sorbitol. Very coarse structure was obtained with the particles sizes around 20 μm. The main difference between this prior art result and the ones reported in the present disclosure comes from the compounding process. In their process the PLA, starch, and sorbitol were dry-mixed and fed together into a twin-screw extruder. This does not provide the proper incorporation of the plasticizer into the TPS phase and does not enable to complete starch gelatinization prior to TPS/PLA mixing.

Tensile Characterization

Figure 6:
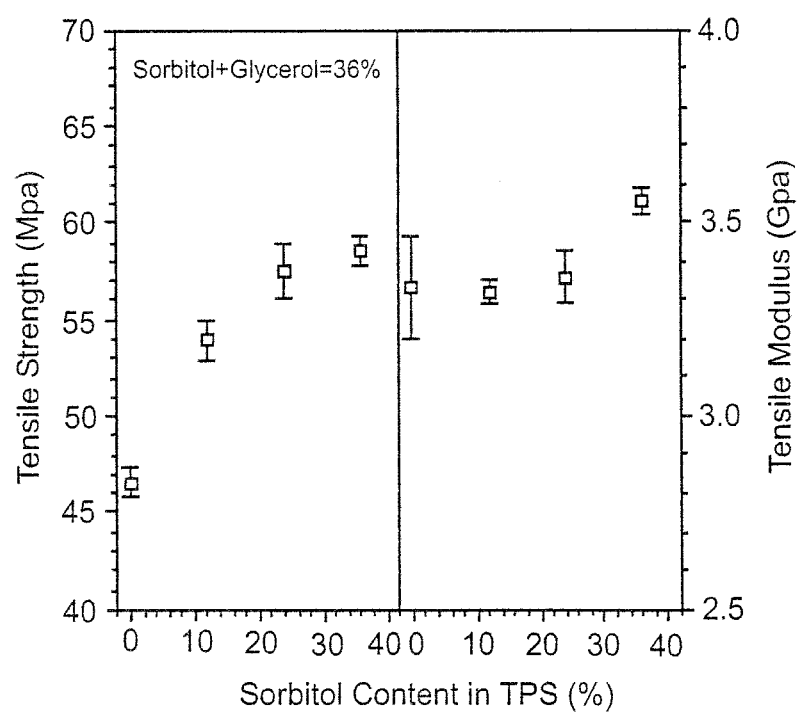

FIG. 6 shows the tensile strength and modulus for the uncompatibilized 27% TPS/PLA blends comprising different glycerol:sorbitol ratios. The tensile strength increased progressively from 47 MPa for glycerol plasticized blend, to 59 MPa for sorbitol (complete substitution) plasticized blend. The modulus also increased from around 3.3 GPa, for the glycerol plasticized blend to 3.5 GPa. The finer morphology observed with sorbitol therefore had clear benefits in terms of material rigidity and strength. In terms of ultimate properties, all materials exhibited low elongation at break, between 4% and 4.7%, as expected from the brittle nature of PLA.

It is also noteworthy that sorbitol, a solid particulate at room temperature, could not be incorporated using the prior art starch-slurry process without using an excessive initial water concentration to make the slurry flowable. In the present disclosure, the plasticizer input concentration is decoupled from the starch concentration since the ingredients are incorporated separately. Therefore, the advantageous properties obtained with the use of sorbitol/glycerol mixtures for starch plasticization could not be obtained without the concentration flexibility provided by the present invention.

REFERENCES

The contents of the entirety of each of which are incorporated by this reference.

Aichholzer W, Fritz H G. (1998) Rheological characterization of thermoplastic starch materials. *Starch-Starke.* 50: 77-83.

Averous L. (2004) Biodegradable multiphase systems based on plasticized starch: a review. *Journal of Macromolecular Science-Polymer Reviews.* C44: 231-274.

Chapleau N, Huneault M A, Li H B. (2007) Biaxial Orientation of Polylactide/Thermoplastic Starch Blends. *International Polymer Processing.* 5: 402-409.

Favis B D, Rodriguez F, Ramsay B A. (2003) Polymer Compositions Containing Thermoplastic Starch. U.S. Pat. No. 6,605,657 issued Aug. 12, 2003.

Favis B D, Rodriguez F, Ramsay B A. (2005) Method of Making Polymer Compositions Containing Thermoplastic Starch. U.S. Pat. No. 6,844,380 issued Jan. 18, 2005.

Favis B D, Rodriguez F, Ramsay B A. (2008) Polymer Compositions Containing Thermoplastic Starch and Process of Making. Canadian patent 2,395,260 issued Feb. 5, 2008.

Huneault M, Mighri F, Ko G H, Watanabe F. (2001) *Polymer Engineering & Science.* 41: 672-683.

Huneault M A, Li H B. (2007) Morphology and properties of compatibilized polylactide/thermoplastic starch blends. *Polymer.* 48: 270-280.

Ke T, Sun X. (2001) *Transaction of the American Society of Agricultural Engineers.* 44: 945-953.

Mihai M, Huneault M A, Favis B D, Li H B. (2007) Foaming of PLA/Thermoplastic Starch Blends. *Macromolecular Bioscience.* 7: 907-920 (2007).

Rodriguez-Gonzalez F J, Ramsay B A, Favis B D. High performance LDPE/thermoplastic starch blends: a sustainable alternative to pure polyethylene. (2003) *Polymer.* 44(5): 1517-1526.

Schwach E, Averous L. (2004) Starch-based biodegradable blends: morphology and interface properties. *Polymer International.* 53: 2115-2124.

Seidenstucker T, Fritz H-G. Compounding Procedure, Processing Behaviour and Property Profiles of Polymeric Blends Based on Thermoplastic Poly(ester-urethanes) and Destructurized Starch. (1999) *Starch-Starke.* 51(2-3): 93-102.

Vergnes B, Villemaire J P. (1987) Rheological behaviour of low moisture molten maize starch. *Rheol Acta.* 26: 570-576.

Villar M A, Thomas E L, Armstrong R C. (1995) Rheological properties of thermoplastic starch and starch/poly (ethylene-co-vinyl alcohol) blends. *Polymer.* 36: 1869-1876.

Wang X L, Yang K K, Wang Y Z. (2003) Properties of starch blends with biodegradable polymers. *Journal of Macromolecular Science-Polymer Reviews.* C43: 385-409.

Wiedmann W, Strobel E. (1991) Compounding of Thermoplastic Starch with Twin-screw Extruders. *Starch-Starke.* 43(4): 138-145.

Willett J L, Jasberg B K, Swanson C L. (1995) Rheology of Thermoplastic Starch: Effect of Temperature, Moisture Content, and Additives on Melt Viscosity. *Polymer Engineering and Science.* 35(2): 202-210.

Other advantages that are inherent to the structure are obvious to one skilled in the art. The embodiments are described herein illustratively and are not meant to limit the scope of the invention as claimed. Variations of the foregoing embodiments will be evident to a person of ordinary skill and are intended by the inventor to be encompassed by the following claims.

What is claimed is:

1. A continuous process of producing a thermoplastic starch/polymer blend comprising:
   (a) introducing starch in a dry form into a twin-screw extruder at a first location along the twin-screw extruder;
   (b) introducing a plasticizer into the twin-screw extruder at a second location along the twin-screw extruder downstream of the first location to form a starch paste and then gelatinizing the starch paste in the twin-screw extruder to form thermoplastic starch; and
   (c) introducing dry solid polymer at ambient temperature into the twin-screw extruder at a third location along the twin-screw extruder downstream of the second location to form the thermoplastic starch/polymer blend with the thermoplastic starch in the extruder,
   wherein the formation of thermoplastic starch in step (b) and the formation of the thermoplastic starch/polymer in step (c) occurs sequentially and in the same twin-screw extruder.

2. The process according to claim 1, wherein the plasticizer comprises a polyfunctional alcohol.

3. The process according to claim 1, wherein the plasticizer comprises water and a polyfunctional alcohol in a ratio in a range of from 0.01:10 to 5:10 w/w water:polyfunctional alcohol.

4. The process according to claim 3, wherein the ratio of water:polyfunctional alcohol is in a range of from 0.5:10 to 2:10 w/w.

5. The process according to claim 2, wherein the polyfunctional alcohol comprises glycerol, sorbitol or a mixture thereof.

6. The process according to claim 2, wherein the polyfunctional alcohol comprises sorbitol.

7. The process according to claim 1, further comprising removing water from the thermoplastic starch before introducing the dry solid polymer.

8. The process according to claim 1, further comprising extruding the thermoplastic starch/polymer blend through an extrusion die to directly form a final product or into an extrudate that will be pelletized prior to further processing.

9. The process according to claim 1, wherein the dry solid polymer is in solid pellet or powder form.

10. The process according to claim 1, wherein the dry solid polymer comprises polyethylene, polypropylene, polystyrene, poly(lactic acid), poly(s-caprolactone), polybutylene succinate, copolymers thereof or mixtures thereof.

11. The process according claim 1, wherein the dry solid polymer is compatibilized with the thermoplastic starch with a compatibilizer.

12. The process according to claim 11, wherein the compatibilizer comprises an unsaturated carboxylic acid anhydride.

13. The process according to claim 1, wherein the plasticizer is introduced in an amount of 40 wt % or less based on a weight of the starch in a dry form.

* * * * *